US006201073B1

(12) United States Patent
Van Gaalen et al.

(10) Patent No.: US 6,201,073 B1
(45) Date of Patent: *Mar. 13, 2001

(54) TERTIARY CARBOXYL-FUNCTIONAL POLYESTER DERIVED FROM CYCLOHEXANE DICARBOXYLIC ACID AND DIHYDROXYMONO CARBOXYLIC ACID

(75) Inventors: Ronald Petrus Clemens Van Gaalen; Petrus Gerardus Kooijmans; Leo Wim Van Noort, all of Amsterdam (NL)

(73) Assignee: Shell Oil Company, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/978,203

(22) Filed: Nov. 25, 1997

(30) Foreign Application Priority Data

Dec. 2, 1996 (EP) .................................................. 96203413

(51) Int. Cl.[7] .......................... C08G 63/06; C08G 63/199
(52) U.S. Cl. ............................................ 525/437; 525/448
(58) Field of Search ...................................... 525/437, 448

(56) References Cited

U.S. PATENT DOCUMENTS

| 5,138,078 | 8/1992 | Brytus | 528/335 |
| 5,576,397 | * 11/1996 | Oberessl et al. | 525/444 |

FOREIGN PATENT DOCUMENTS

| 0612779 A2 | 2/1994 | (EP) . |
| 0634434 A2 | 7/1994 | (EP) . |
| 0720997 A2 | 1/1996 | (EP) . |

* cited by examiner

*Primary Examiner*—Robert E. L. Sellers

(57) ABSTRACT

Linear, tertiary carboxyl functional polyester resins are obtained by reaction of (a) at least one 1,4-dicarboxylcyclohexane (A), optionally mixed with a minor weight fraction of an alkane dicarboxylic acid containing in the range of from 8 to 16 carbons atoms (A'), (b) at least one dihydroxymonocarboxylic acid compound (B) containing a tertiary aliphatic carboxyl group and two aliphatic hydroxyl groups, (c) optionally, one diol compound (C) containing two aliphatic hydroxyl groups, each independently being a primary or a secondary hydroxyl group, and (d) optionally, a compound (D') containing one monofunctional primary or secondary hydroxyl group and/or a compound (D") containing one primary or secondary hydroxyl group and one tertiary aliphatic carboxyl group, the molar ratio of the compounds (A+A'):B:C:D':D" being X+Y+1:Y:X:M:N wherein M+N is in the range of from 0 to 2, wherein X ranges from 2 to 8, and Y ranges from [2−(M+N)] to 8, at a temperature of from 100 to 225 ° C., until essentially all the non-tertiary carboxyl groups as initially present in the reaction mixture have been reacted; polyglycidylesters derived from said polyester resins; and coating compositions comprising at least one polyester resin and/or at least one polyglycidylester resin.

4 Claims, No Drawings

TERTIARY CARBOXYL-FUNCTIONAL POLYESTER DERIVED FROM CYCLOHEXANE DICARBOXYLIC ACID AND DIHYDROXYMONO CARBOXYLIC ACID

The present invention relates to linear, tertiary carboxyl functional polyester resins, to a process for the preparation of the resins, to polyglycidylester resins obtainable by glycidating said linear, tertiary carboxyl functional polyester resins, to coating compositions, especially powder coating compositions, comprising said linear, tertiary carboxyl functional polyester resins or said polyglycidylester resins and to cured products obtained by using the indicated coating compositions.

Powder coating compositions based on the solid reaction products of 2,2-bis-(4-hydroxyphenyl)propane and epichlorohydrin are known already for a long time. The cured products prepared on the basis of these compositions are resistant against hydrolysis, however, they only show a low ultraviolet resistance and are therefore not suitable for applications requiring a high outdoor durability such as building parts or automotive topcoats.

Triglycidylesters which can be used in good quality outdoor durable coatings and in moulding compositions are disclosed in European Patent Application No. 447360 (EP-A-447,360). Due to the secondary nature of the terminal carboxyl functions present in the tricarboxylic acid adduct precursors, strong alkaline conditions should be avoided during glycidation of these tricarboxylic acid adducts to avoid hydrolysis of the glycidylester formed and/or hydrolysis of one or more ester groups in the resin backbone. As a result thereof the triglycidylester produced will contain a relatively high level of hydrolizable chlorine and/or will contain low molecular weight hydrolysis products which might cause toxicity problems.

The high level of hydrolizable chlorine is reflected in example 2 of EP-A-447,360 which relates to the glycidation of the 2:1 adduct of hexahydrophthalic anhydride and dimethylolpropionic acid. The product obtained has a chlorine content of 1.5%. Such a high level of residual chlorine is generally undesirable in coating compositions. In addition, due to the fact that the triglycidylesters reported in EP-A-447,360 are liquid, they can not be applied in powder coating compositions.

The most commonly used system for outdoor durable powder coatings are polyester/triglycidylisocyanurate (TGIC). For health and safety reasons however the use of TGIC is viewed with suspicion. TGIC is relatively toxic (Rat Oral $LD_{50}$ of 0.4 g/kg) and there are indications that the compound is mutagenic according to the Ames Mutagenicity Test.

European patent application No. 0634434 describes a process for the preparation of linear tertiary aliphatic carboxyl functional polyester resins, by reacting:

(a) at least one compound A' comprising one monofunctional primary- or secondary hydroxyl group and/or at least one compound A" comprising one primaryor secondary hydroxyl group and one tertiary aliphatic carboxyl group;

(b) at least one aromatic or cycloaliphatic dicarboxylic acid compound B comprising two aromatic- or secondary aliphatic carboxyl groups or the anhydride thereof;

(c) at least one diol compound C comprising two aliphatic hydroxyl groups, which may independently be a primary or a secondary hydroxyl group; and (d) at least one dihydroxymonocarboxylic acid compound D comprising a tertiary aliphatic carboxyl group and two aliphatic hydroxyl groups, which may each independently be primary or secondary hydroxyl, the molar ratio of compounds A':A":B:C:D being

M:N:X+Y+1:X:Y wherein M+N=2, X ranges from 2 to 8 and Y ranges from 2−N to 8, at a temperature of from 100 to 240° C., until essentially all the non-tertiary carboxyl groups as initially present in the reaction mixture have been reacted.

As preferred component (b) were described and exemplified hexahydrophthalic anhydride.

Moreover in this application were disclosed polyglycidylester resins obtainable by reacting said linear tertiary aliphatic carboxyl functional polyesters with an excess epihalohydrin in the presence of a suitable base and catalyst. Preferably, the polyesters were reacted with epichlorohydrin. Both the specified linear polyesters and the corresponding polyglycidylesters derived therefrom were used with a cross-linking agent for powder coating compositions.

The European patent application No. 0720997, describes a linear tertiary carboxyl functional polyester and epoxy functional polyester resins therefrom. These polyester resins were produced by reaction of:

a) at least one aromatic and/or cycloaliphatic carboxylic acid compound A comprising two aromatic- and/or secondary aliphatic carboxyl groups or the anhydride thereof, b) at least one hydroxyl compound B comprising two aliphatic hydroxyl groups, which groups each independently may be primary or secondary hydroxyl groups, c) at least one hydroxyl substituted carboxylic acid compound C comprising at least one tertiary aliphatic carboxyl group and two aliphatic hydroxyl groups, which groups each independently may be primary or secondary hydroxyl groups, and d) optionally one carboxylic acid compound D comprising one carboxyl group, the molar ratio of compounds A:B:C:D being (X+Y−1):X:Y:Z, wherein X ranges from 2 to 8, Y ranges from 2 to 8, and Z ranges from 0 to 2.

These polyester resins could be used together with a suitable curing agent for the production of powder coatings, or could be converted into the corresponding glycidylesters, which in combination with a suitable curing agent could be used for the production of powder coatings.

Although the linear tertiary aliphatic carboxyl functional polyester resins and the polyglycidylesters thereof enabled a certain progress as to the requirements of excellent outdoor durability (UV stability) and resistance against hydrolysis in the cured state, with reference to their use in modern economically applied powder coatings, there is still a need for further improvement of this combination of properties.

Therefore, it is an object of the invention to provide linear, acid functional polyester resins in which the acid-functionality only comprises tertiary aliphatic carboxylic acid functionality, which can be readily glycidated so as to form a polyglycidylester resin. Such linear, tertiary carboxyl functional polyester resin and such polyglycidylester resin preferably show further improved properties when used in outdoor durable powder coating compositions, which are relatively environmentally friendly.

Accordingly, the present invention provides linear, tertiary carboxyl functional n polyester resins produced by reacting (a) at least one 1,4-dicarboxylcyclohexane (A) optionally mixed with a minor weight fraction of an alkane dicarboxylic acid, containing in the range of from 8 to 16 carbons atoms (A'),
(b) at least one dihydroxymonocarboxylic acid compound (B), comprising a tertiary aliphatic carboxyl group and two aliphatic hydroxyl groups,
(c) optionally one diol compound (C) comprising two aliphatic hydroxyl groups, which may each independently be a primary or a secondary hydroxyl group, and
(d) optionally a compound (D') comprising one monofunctional primary or secondary hydroxyl group and/or a compound (D") comprising one primary or secondary hydroxyl group and one tertiary aliphatic carboxyl group, the molar ratio of the compounds (A+A'):B:C:D':D" being X+Y+1:Y:X:M:N wherein M+N is in the range of from 0 to 2, and preferably from 0.5 to 2, and more preferably from 1 to 2, wherein X ranges from 2 to 8, and Y ranges from (2−(M+N)) to 8, at a temperature of from 100 to 225° C., until essentially all the non-tertiary carboxyl groups as initially present in the reaction mixture have been reacted.

The linear tertiary aliphatic carboxyl functional polyester resin thus produced is essentially free from non-tertiary carboxyl groups when it has an acid value which practically corresponds to the theoretical acid value calculated on the basis of the amount of tertiary carboxyl groups of the reactants as initially present in the reaction mixture. The term "practically" is used herein to indicate a deviation from the theoretical value of +/−5% at most and preferably 3% at most. This is determined by standard alkali metric titration.

For those skilled in the art it will be understood that the molecular weight distribution and number average molecular weight of the resin produced will depend on the specific reactants and the ratios applied in the process of the invention. Whilst the tertiary aliphatic carboxyl groups present in compounds D" and B practically do not react under the esterification conditions employed, glycidation of these tertiary aliphatic carboxyl groups with epihalohydrin can be performed under standard alkaline conditions whereby a polyglycidylester resin can be obtained which contains a low hydrolizable halogen content, usually lower than 0.5% by weight based on the total weight of the composition.

It will be appreciated that other aspects of the present invention are formed by polyglycidylesters of the hereinbefore specified linear carboxyl functional polyesters and by coating compositions, and more in particular powder coating compositions, comprising said linear, tertiary carboxyl functional polyester resins and/or said polyglycidylesters derived therefrom and by cured products obtained by using these coating compositions.

The process for preparation of the linear tertiary aliphatic carboxyl functional polyester may in general be carried out according to conventional esterification methods, preferably by azeotropic condensation. In particular, the condensation is carried out by charging the compounds A to D simultaneously to the reactor whereafter the temperature is increased from room temperature to from 180 to 210 ° C. during a period of 3 to 8 hours, thus allowing the reaction to initiate and to proceed under continuous azeotropic removal of water. Generally the azeotropic removal of water is being continued until a reaction product is obtained which has an acid value which corresponds to the theoretical acid value as referred to above. An esterification catalyst known in the art, such as for example dibutyltinoxide, paratoluenesulphonic acid, tinoctoate, zincoctoate and lithium ricinoleate may be used in the esterification process but is in general not required.

The fraction of the optional alkane dicarboxylic component containing from 8 to 16 carbon atoms is in the range of from 0 to 25 wt % relative to the total weight of the components A+A'. Preferably the alkane dicarboxylic component contains from 8 to 12 carbon atoms and most preferably 1,10-decane dicarboxylic acid is used, if any.

Suitable compounds C as starting materials for the linear tertiary aliphatic carboxyl functional polyesters of the present invention include branched aliphatic-, cycloaliphatic-, or araliphatic compounds, containing two aliphatic hydroxyl groups, each individually being either a primary or a secondary hydroxyl group, such as for example propylene glycol, neopentylglycol, hydrogenated diphenylolpropane (HDPP), hydrogenated 4,4'-dihydroxydiphenyl, 1,4-cyclohexanedimethylol, 1,4-dihydroxycyclohexane, hydroxypivalylhydroxypivalate and 2-butyl-2-ethyl-1,3-propanediol or mixtures thereof; HDPP being particularly preferred.

A typical example of a suitable compound B as starting material for the linear, tertiary aliphatic carboxyl functional polyesters of the present invention is dimethylolpropionic acid.

Suitable compounds D' as starting material for the linear polyesters of the present invention are aliphatic and cycloaliphatic alcohols having one primary or one secondary hydroxyl group and having of from 1 to 6 carbon atoms, such as for example methanol, isopropanol, neopentanol, 2-butanol and cyclohexanol. Suitable compounds D" are aliphatic and cycloaliphatic alcohols having one primary or one secondary hydroxyl group and having of from 1 to 6 carbon atoms and having in addition one tertiary aliphatic carboxyl group such as for example cyclohexane-1-methyl-4-hydroxy carboxylic acid the 1:1 (molar ratio) reaction product of dimethylolpropionic acid and cyclohexanecarboxylic acid, hydroxypivalic acid, and a reaction adduct derived from highly branched saturated carboxylic acid mixtures, each mixture containing from 5 to 14 carbon atoms, preferably VERSATIC 5, 9 or 10 acids (VERSATIC is a trademark) and at least one glycicylester thereof, in a 1:1 molar ratio of the components.

According to preferred embodiments of the polyester resins of the present invention, the component D" will be the sole component or the predominant component (>50 wt % of the mixture of D' and D"), if present, i.e. the proportion of D" (N) is in the range of from 0.5 to 2.

It will be appreciated that the two moles of VERSATIC acid mixtures, finally included in the adduct compound D" may be the same or different.

For example combinations of VERSATIC 10 (highly branched saturated carboxylic acids, having 10 carbon atoms) or VERSATIC 9 (highly branched saturated carboxylic acids, having 9 carbon atoms) and VERSATIC 5 acids can be included or 2 moles of VERSATIC 5 or 2 moles of VERSATIC 9 acids can be included in the reaction adduct (1:1).

Preferably, the reaction adduct compound contains highly branched saturated carboxylic acids, such as VERSATIC acids, of different molecular sizes. More preferably, in order to obtain optimal powder coating properties of the linear polyesters derived from it, a reaction adduct of 1 mole of highly branched saturated carboxylic acids, having 5 carbon atoms such as VERSATIC 5 acids, and 1 mole of the glycidylesters of highly branched saturated carboxylic acids having 10 carbon atoms, such as CARDURA E10 is used (CARDURA is a trademark).

Another preferred representative of compounds of category D" is hydroxypivalic acid.

As indicated above the linear tertiary aliphatic carboxyl functional polyester resin obtainable according to the process of the present invention can be easily converted to a polyglycidylester resin according to methods known in the art i.e. by reaction with an excess epihalohydrin in the presence of a suitable base and catalyst. Most conveniently epichlorohydrin is used.

It has surprisingly been found that both the linear tertiary aliphatic carboxyl functional polyester resin and the polyglycidylester resin of the present invention can provide powder coating compositions, which show significantly improved mechanical properties and in particular the flexibility.

It will be appreciated that due to the polymeric nature of the polyglycidylester resin of the present invention a relatively low level of toxicity can now be combined with excellent UV outdoor durability and hydrolysis resistance.

It was found that those polyglycidylester resins derived from the linear tertiary aliphatic carboxyl functional polyester resins of the invention carried out X ranges from 3 to 6 and Y simultaneously ranges from 2 to 4, and wherein N is in the range from 0.5 to 2, are particularly suitable for use in outdoor durable powder coating compositions.

The curable powder coating compositions of the invention may be prepared by addition of a cross-linking resin to either the hereinbefore specified linear tertiary aliphatic carboxyl functional polyester resins of the present invention or to the polyglycidylester resin obtainable by glycidating said linear tertiary aliphatic carboxyl functional polyester resin.

The amount of cross-linking compound used in the powder coating compositions of the invention will normally be such so as to provide about equal amounts of reactive groups of the cross-linking compound and of the tertiary aliphatic carboxyl groups present in the linear tertiary aliphatic carboxyl functional polyester resin or of the epoxy groups present in the polyglycidylester resin.

Suitable cross-linking resins for use in combination with the linear tertiary aliphatic carboxyl functional polyester resins of the present invention are for example outdoor durable epoxy resins, such as for example the polyglycidylester resins according to the present invention, the diglycidylesters of alpha, alpha'-dibranched dicarboxylic acids as disclosed in European Patent Application publication number 518,408 and the polyglycidylesters based on polycarboxylic acids carrying two alkyl substituents on each of the alpha carbon atoms as disclosed in European patent application publication number 366,205.

Suitable cross-linking resins for use in combination with the polyglycidylester resins of the present invention are for example the (corresponding) acid functional polyester resin of the present invention; solid polyacids such a sebacic acid, 1,12-dodecanedioic acid; the reaction product of 1,6-hexanediol with a molar excess of 1,12-dodecanedioic acid, the reaction product of 4 moles 1,10-decanedicarboxylic acid, 1.49 mols hexanediol, 0.47 mols 1,1,1-tris-(hydroxymethyl)-propane and 0.27 mols pentaerythritol, the reaction product of 4 mols 1,10-decanedicarboxylic acid, 1.2 mols hexanediol, 0.45 mols trimethylolpropane, 0.29 mols pentaerythritol and 0.21 mols dimethylolpropionic acid and the reaction product of one mole of hexamethoxymethylmelamine and 3 moles of hydroxypivalic acid, and amine-type curing agents.

Most preferred are combinations of the linear tertiary aliphatic carboxyl functional polyester resins and the polyglycidylesters derived therefrom.

The powder coating compositions of the present invention may further comprise a catalyst and optionally other additives, as known in the art to be suitable for use in powder coating compositions.

Suitable catalysts are for example quaternary ammonium and phosphonium salts; metal salts/compounds such as for example stannous(II)octoate; basic compounds such as for example the imidazoles; and tertiary amines such as for example diazabicyclo/undecene.

The amount of catalyst used will usually be somewhere in the range of from 0.1 to 2% by weight based on the weight of the total powder coating composition.

Suitable cure times and cure temperatures of the powder coating compositions of the invention are those conventionally applied in connection with powder coating systems.

The invention is illustrated by the following examples, however without restricting its scope to these specific embodiments.

EXAMPLE 1

Preparation of linear tertiary aliphatic carboxyl functional polyesters 1 to 6 according to the invention and one comparative polyester according to EP-0634434A2.

Compounds (A) to (F) were charged in molar amounts as indicated in Table 1 in a roundbottom glass reactor, equipped with Dean & Stark Trap with reflux condenser, temperature control, nitrogen inlet and stirrer.

The mixture was then heated to 150° C. in 30 minutes and xylene was added (5% weight on the total weight of the reaction mixture). The temperature of the reaction mixture was increased in two hours to 210° C. and kept at 210° C. until the theoretical acid value as referred to above was reached. The acid functional polyester thus formed was discharged and allowed to cool down to room temperature.

TABLE 1*°

| Polyester Resin | 1 | 2 | 3 | 4 | 5 | 6 | a |
|---|---|---|---|---|---|---|---|
| (A) CHCA-1,4 | 9 | 9 | 6 | 7 | 5 | 5 | — |
| (B) DMPA | 2 | 3 | 2 | 8 | 3 | 4 | 2 |
| (C) HDPP | 6 | 5 | 3 | — | 1 | — | 6 |
| (D) HPA | 2 | 2 | 2 | — | 2 | 2 | 2 |
| (E) DDA | — | — | — | 2 | — | — | — |
| (F) HHPA | — | — | — | — | — | — | 9 |

*Numbers given represent the amount of moles of a particular compound charged to the reactor in the process of example 1 for the preparation of the linear tertiary carboxyl functional polyester resins 1 to 5.
°The chemical compounds represented by the abbreviations used are:
HPA: hydroxypivalic acid
HHPA: hexahydrophthalic anhydride
DMPA: dimethylolpropionic acid
HDPP: hydrogenated diphenylolpropane
CHCA-1,4: 1,4-dicarboxylcyclohexane
DDA: 1,10-decane dicarboxylic acid

EXAMPLE 2

Preparation of polyglycidylester resins 1–3 and comparative a.

An amount equalling 1 carboxyl group equivalent of a linear tertiary aliphatic carboxyl functional polyester resin 1 to 3 and a, as prepared in example 1 was dissolved in 8moles epichlorohydrin (ECH) and isopropylalcohol (IPA). The solution was charged to a 3 litre glass-reactor equipped with a temperature control, stirrer and reflux condensor. Next the temperature was raised to 70° C., followed by the gradual addition of an aqueous solution of 1.2 moles NaOH over a period of time of 60 minutes. After an additional reaction period of 10 minutes the reactor content was allowed to settle and the aqueous phase was separated from the organic phase.

The organic phase was vacuum flashed to remove water, IPA and ECH.

The resulting product was dissolved in toluene and the organic phase was washed three times with water whereafter the organic phase was vacuum flashed to remove toluene. The glycidylester thus obtained was discharged and allowed to cool down. Characteristics of the solid polyglycidylester resins prepared EP1, EP2, EP3 and EPa are presented in Table 2.

TABLE 2

|  | EP1 | EP2 | EP3 | EPa |
|---|---|---|---|---|
| EGC [mmol/kg] | 1000 | 1800 | 1400 | 1000 |
| Tg(DSC) [° C.] | 48 | 11 | 17 | 52 |

EXAMPLE 3

Powder coating compositions PC1–PC3, according to the invention and comparative compositions PCa, PCb and PCc.

All ingredients as indicated in Table 3 were mixed at room temperature, then melt-blended on a Buss single screw extruder at 110° C. The extrudate was chilled, flaked, ground in a micromill and classified through 106 micrometre mesh. The powder was electrostatically sprayed onto chromate pretreated, 2 mm thick aluminium panels. The coated panels were baked at 200° C. for 15 minutes. The resultant coatings (thickness 40–60 micrometres) were very smooth, hard, glossy and exhibited good mechanical properties and good weathering resistance, that is less than 10% reduction in gloss after exposure for 2000 hours in a Xenon type weather-O-meter running the SAE J1960 test method.

TABLE 3

| Powder coatings compositions (PC) | | | | | | |
|---|---|---|---|---|---|---|
| glycidylester | PC1 | PC2 | PC3 | PCc | PCa | PCb |
| EP1 | 638 | 598 |  |  |  |  |
| EP3 |  |  | 552 |  |  |  |
| Epa |  |  |  | 592 | 638 | 598 |
| polyester (**) | | | | | | |
| 4 | 150 |  |  |  | 150 |  |
| 5 |  | 190 |  |  |  | 190 |
| 6 |  |  | 236 | 196 |  |  |
| TiO$_2$ | 167 | 167 | 167 | 167 | 167 | 167 |
| MODAFLOW () | 10.1 | 10.1 | 10.1 | 10.1 | 10.1 | 10.1 |
| Benzoin | 0.8 | 0.8 | 0.8 | 0.8 | 0.8 | 0.8 |
| Properties | | | | | | |
|  | PC1 | PC2 | PC3 | PCc | PCa | PCb |
| cure 30' | <–180–200–> | | <–140–160–> | | <–180–200–> | |
| Hardness | <-------200-------> | | | | | |
| Reverse impact° | >80 | >40 | >80 | <10 | 10 | <10 |

| (**) | 4 | 5 | 6 |
|---|---|---|---|
|  | XL1 | XL2 | XL3 |
| Acid value [mmol/kg] | 4250 | 3140 | 4220 |
| Tg (DSC) [° C.] | 30 | 56 | 30 |

() MODAFLOW (trademark) is an acrylic based flow aid.
°measured in inch/pounds according to Erickson type 304 ISO-TR-6272/1979-DIN-55669.

We claim:

1. A linear, tertiary carboxyl functional polyester resin produced by reacting:
   (a) 1,4-dicarboxylcyclohexane (A);
   (b) dimethylolproprionic acid (B);
   (c) hydrogenated diphenylolpropane (C); and
   (d) hydroxypivalic acid (D");
   (e) wherein the molar ratio of compounds A:B:C:D" is (X+Y+1):Y:X:N,
   wherein N is 2, X ranges from 3 to 6, Y ranges from 2 to 3, and (X+Y+1) ranges from 6 to 9, at a temperature of from 100 to 225° C., until essentially all the non-tertiary carboxyl groups as initially present in the reaction mixture have been reacted.

2. The resin of claim 1, wherein X is 6 and Y is 2.

3. The resin of claim 1, wherein X is 5 and Y is 3.

4. The resin of claim 1, wherein Y is 2 and X is 3.

* * * * *